(12) United States Patent
Delp et al.

(10) Patent No.: US 7,886,151 B2
(45) Date of Patent: Feb. 8, 2011

(54) TEMPORAL SYNCHRONIZATION OF VIDEO AND AUDIO SIGNALS

(75) Inventors: Edward J. Delp, West Lafayette, IN (US); Eugene T. Lin, Herndon, VA (US)

(73) Assignee: Purdue Research Foundation, West Lafayette, IN (US)

( * ) Notice: Subject to any disclaimer, the term of this patent is extended or adjusted under 35 U.S.C. 154(b) by 823 days.

(21) Appl. No.: 10/349,322

(22) Filed: Jan. 21, 2003

(65) Prior Publication Data

US 2003/0221106 A1 Nov. 27, 2003

Related U.S. Application Data

(60) Provisional application No. 60/351,350, filed on Jan. 22, 2002.

(51) Int. Cl.
*H04L 9/32* (2006.01)
(52) U.S. Cl. .................. 713/176; 380/43; 380/201; 382/190; 382/282
(58) Field of Classification Search .................. 713/176
See application file for complete search history.

(56) References Cited

U.S. PATENT DOCUMENTS

| | | |
|---|---|---|
| 4,237,484 A | 12/1980 | Brown et al. |
| 4,313,197 A | 1/1982 | Maxemchuk |
| 4,855,697 A | 8/1989 | Jones et al. |
| 4,907,156 A | 3/1990 | Doi et al. |
| 4,972,471 A | 11/1990 | Gross et al. |
| 5,101,432 A | 3/1992 | Webb |
| 5,175,710 A | 12/1992 | Hutson |
| 5,319,735 A | 6/1994 | Preuss et al. |
| 5,613,004 A | 3/1997 | Cooperman et al. |
| 5,659,726 A | 8/1997 | Sandford et al. |
| 5,768,426 A | 6/1998 | Rhoads |
| 5,822,432 A | 10/1998 | Moskowitz |
| 5,825,892 A | 10/1998 | Braudaway et al. |
| 5,832,119 A | 11/1998 | Rhoads |
| 5,841,886 A | 11/1998 | Rhoads |
| 5,841,978 A | 11/1998 | Rhoads |
| 5,850,481 A | 12/1998 | Rhoads |

(Continued)

FOREIGN PATENT DOCUMENTS

EP 1204277 5/2002

(Continued)

OTHER PUBLICATIONS

Fridrich, Jiri, "Visual Hash for Oblivious Watermarking", SPIE vol. 3971, 2000, pp. 286-290.*

(Continued)

*Primary Examiner*—Michael Pyzocha
*Assistant Examiner*—Shewaye Gelagay

(57) ABSTRACT

A protocol for temporal synchronization of media signals with temporal components is used for digital watermarking and other applications. The synchronization protocol achieves initial synchronization by finding an initial synchronization key through analysis of a temporal media signal stream. It then uses features of the stream and a queue of one or more keys from previous frames to derive subsequent keys to maintain synchronization. If synchronization is lost due to channel errors or attacks, for example, the protocol uses the initial synchronization key to re-establish synchronization. In digital watermarking applications, the synchronization protocol is agnostic to the watermark embedding and reading functions.

16 Claims, 3 Drawing Sheets

State Machine

○ Each state describes how to generate next watermark ($K_{i+1}$) from the current watermark ($K_i$)

○ The state machine itself has redundancy because possible number of next states from a given state is finite

U.S. PATENT DOCUMENTS

| | | | |
|---|---|---|---|
| 5,859,920 | A | 1/1999 | Daly et al. |
| 5,862,260 | A | 1/1999 | Rhoads |
| 5,889,868 | A * | 3/1999 | Moskowitz et al. ......... 713/176 |
| 5,905,800 | A | 5/1999 | Moskowitz et al. |
| 5,933,798 | A | 8/1999 | Linnartz |
| 6,031,914 | A | 2/2000 | Tewfik |
| 6,101,602 | A | 8/2000 | Fridrich |
| 6,122,403 | A | 9/2000 | Rhoads |
| 6,226,387 | B1 | 5/2001 | Tewfik et al. |
| 6,249,870 | B1 | 6/2001 | Kobayashi et al. |
| 6,259,801 | B1 | 7/2001 | Wakasu |
| 6,272,634 | B1 | 8/2001 | Tewfik et al. |
| 6,282,299 | B1 | 8/2001 | Tewfik et al. |
| 6,310,962 | B1 | 10/2001 | Chung et al. |
| 6,330,673 | B1 | 12/2001 | Levine |
| 6,341,350 | B1 | 1/2002 | Miyahara et al. |
| 6,345,100 | B1 | 2/2002 | Levine |
| 6,353,672 | B1 | 3/2002 | Rhoads |
| 6,374,036 | B1 | 4/2002 | Ryan et al. |
| 6,442,284 | B1 | 8/2002 | Gustafson et al. |
| 6,557,103 | B1 | 4/2003 | Boncelet, Jr. et al. |
| 6,611,599 | B2 | 8/2003 | Natarajan |
| 6,642,966 | B1 | 11/2003 | Limaye |
| 6,681,027 | B1 | 1/2004 | Lu |
| 6,785,401 | B2 * | 8/2004 | Walker et al. ............... 382/100 |
| 6,792,130 | B1 * | 9/2004 | Jones et al. ................. 382/100 |
| 6,804,374 | B1 * | 10/2004 | Beattie et al. ............... 382/100 |
| 6,807,285 | B1 | 10/2004 | Iwamura |
| 6,901,514 | B1 | 5/2005 | Iu et al. |
| 6,957,350 | B1 * | 10/2005 | Demos ........................ 360/60 |
| 2001/0028715 | A1 | 10/2001 | Watanabe |
| 2001/0049788 | A1 * | 12/2001 | Shur .......................... 713/179 |
| 2002/0029338 | A1 | 3/2002 | Bloom et al. |
| 2002/0056041 | A1 | 5/2002 | Moskowitz |
| 2002/0090110 | A1 | 7/2002 | Braudaway et al. |
| 2002/0097873 | A1 | 7/2002 | Petrovic |
| 2002/0191809 | A1 | 12/2002 | Kirovski et al. |
| 2003/0016825 | A1 * | 1/2003 | Jones ......................... 380/210 |
| 2005/0071377 | A1 | 3/2005 | Mihcak |

FOREIGN PATENT DOCUMENTS

| | | | |
|---|---|---|---|
| EP | 1217840 | | 6/2002 |
| WO | WO 99/11020 | * | 3/1999 |
| WO | WO01/39121 | | 5/2001 |
| WO | WO02/13138 | | 2/2002 |

OTHER PUBLICATIONS

Holliman et al. "Robust frame-dependent Video Watermarking" SPIE, 2000, pp. 186-197.*

Swanson et al. "Multiresolution Scene-Based Video Watermarking Using Perceptual Models" IEEE, 1998, pp. 540-550.*

U.S. Appl. No. 60/351,502, filed Jan. 22, 2002, Bradley.

Bas et al., "Geometrically Invariant Watermarking Using Feature Points," IEEE Transactions on Image Processing, vol. 11, No. 9, Sep. 2002, pp. 1014-1028.

Boulgouris et al., "Self-Synchronizing Watermark Detection for MPEG-4 Objects," in the 8th IEEE Int. Conf. on Electronics, Circuits, and Systems 2001, vol. 3, Oct. 2-5, 2001, pp. 1371-1374.

Craver et al., "Resolving Rightful Ownerships with Invisible Watermarking Techniques: Limitations, Attacks and Implications," IEEE Journal on Selected Areas in Communications, vol. 16, No. 4, pp. 573-586, May, 1998.

Deguillaume et al., "Robust 3D DFT Video Watermarking," SPIE vol. 3657, 1999, pp. 113-124.

Delannay et al., "Generalized 2-D Cyclic Patterns for Secret Watermark Generation," in Proc. of the IEEE Int. Conf. on Image Processing 2000, vol. 2, Vancouver, Canada, Oct. 10-13, 2000, pp. 77-79.

Dittmann et al., A New Approach for Transformation Invariant Image and Video Watermarking in the Spatial Domain: SSP-Self Spanning Patterns, Proc. SPIE vol. 3971, (2000) pp. 176-185.

Dugelay et al, "Possible Counter-Attacks Against Random Geometric Distortions," Proc. of SPIE, vol. 3971 (2000), pp. 338-345.

Fridrich, "Visual Hash for Oblivious Watermarking," Proc. of SPIE vol. 3971, 2000, pp. 286-294.

Hartung et al., "Multimedia Watermarking Techniques," Proc. of the IEEE, vol. 87, No. 7, Jul. 1999, pp. 1079-1107.

Hartung et al., "Fast Public-Key Watermarking of Compressed Video," 1997 IEEE, pp. 528-531.

Hartung et al., "Watermarking of Uncompressed and Compressed Video," Signal Processing 66 (1998) pp. 283-301.

Herrigel et al., "The Watermark Template Attack," Proc. of SPIE Security and Watermarking of Multimedia Contents III, vol. 4314 (2001), pp. 394-405.

Holliman et al., "Robust Frame-Dependent Video Watermarking," Proc. of SPIE vol. 3971 (2000), pp. 186-197.

Kalker et al., "A Video Watermarking System for Broadcast Monitoring," SPIE vol. 3657, 1999, pp. 103-112.

Kutter, Performance Improvement of Spread Spectrum Based Image Watermarking Schemes Through M-ary Modulation Dresden Information Hiding Workshop, 1999, pp. 245-259.

Lancini et al., A Robust Video Watermarking Technique in the Spatial Domain, in IEEE Region-8 Int. Symposium on Video/Image Processing and Multimedia Communications, Zadar, Croatia, Jun. 16-19, 2002, pp. 251-256.

Langelaar et al., "Watermarking Digital Image and Video Data, A State-of-the-Art Overview," IEEE Signal Processing Magazine, Sep. 2000, pp. 20-46.

Langelaar et al., "Optimal Differential Energy Watermarking of DCT Encoded Images and Video," 2001 IEEE, pp. 148-158.

Lichtenauer et al., "Exhaustive Geometrical Search and the False Positive Watermark Detection Probability," SPIE vol. 5020 (2003), pp. 203-214.

Lin et al., "Rotation, Scale, and Translation Resilient Watermarking for Images," IEEE Transactions on Image Processing, vol. 10, No. 5, pp. 767-782, May 2001.

Lin et al., "Streaming Video and Rate Scalable Compression: What are the Challenges for Watermarking?" Proc. of SPIE vol. 4314 (2001) pp. 116-125.

Niu et al., "Video Watermarking Resisting to Rotation, Scaling, and Translation," Proc. of SPIE, vol. 4675 (2002), pp. 512-519.

Onishi et al., "A Method of Watermarking with Multiresolution Analysis and Pseudo Noise Sequences," Systems and Computers in Japan, vol. 29, No. 5, 1998, pp. 11-19.

ORuanaidh et al., "Rotation, Scale and Translation Invariant Spread Spectrum Digital Image Watermarking," Signal Processing 66 (1998) pp. 303-317.

Pereira et al., "Robust Template Matching for Affine Resistant Image Watermarks," IEEE Trans. on Image Processing, vol. 9, No. 6, Jun. 2000, pp. 1123-1129.

Setyawan et al., "Synchronization-Insensitive Video Watermarking Using Structured Noise Pattern," Proc. of SPIE, vol. 4675 (2002), pp. 520-530.

Swanson et al., "Multimedia Data-Embedding and Watermarking Technologies," Proc. of the IEEE, vol. 86, No. 6, Jun. 1998, pp. 1064-1087.

Voloshynovskiy et al., Attacks on Digital Watermarks: Classification, Estimation-Based Attacks, and Benchmarks, IEEE Communications Magazine, Aug. 2001, pp. 2-10.

Wolfgang et al., "Perceptual Watermarks for Digital Images and Video," Proc. of the IEEE, vol. 87, No. 7, pp. 1108-1126, Jul. 1999.

Wu et al., "Robust and Efficient Digital Audio Watermarking Using Audio Content Analysis," Proc. SPIE, vol. 3971 (2000), pp. 382-392.

Wu et al., "Transporting Real-Time Video Over the Internet: Challenges and Approaches," Proc. of the IEEE, vol. 88, No. 12, pp. 1855-1877, Dec. 2000.

Aura, "Practical Invisibility in Digital Communication," Information Hiding, First Intl. Workshop Proc., May 30-Jun. 1, 1996, pp. 265-278.

Fridrich, "Visual Hash for Oblivious Watermarking," Security and Watermarking of Multimedia Contents II, Proc. of SPIE vol. 3971, 2000, pp. 286-294.

* cited by examiner

TEMPORAL SYNCHRONIZATION OF VIDEO AND AUDIO SIGNALS

RELATED APPLICATION DATA

This application claims the benefit of U.S. Provisional Application No. 60/351,350, filed Jan. 22, 2002, which is hereby incorporated by reference.

TECHNICAL FIELD

The invention relates to multimedia signal processing, temporal synchronization protocols for video and audio, and temporal synchronization in digital watermarking applications.

BACKGROUND AND SUMMARY

In the field of video and audio signal processing, there are a number of applications where a media signal processor has to perform temporal synchronization of the media signal. Temporal synchronization generally refers to a process for finding a reference coordinate system in the time domain of the signal. Typically, video signals are comprised of a stream of image frames at discrete time intervals. In many applications, however, a media processor may receive a collection of frames without knowing the temporal coordinate system for the frames. For a given arbitrary frame, the time point of that frame within a given program, scene or other semantic grouping is often unclear. Frames may be inserted, lost, or added due to transmission errors in the communication channel or due to intentional attacks on the stream. Further, the sampling rate may fluctuate due to speed changes, bandwidth fluctuations, or format conversions. This lack of temporal synchronization can lead to improper interpretation and handling of the video.

One specific example where temporal synchronization plays a role is video digital watermarking, where auxiliary data is hidden within a video stream and extracted without the original video signal. When it receives a sequence of frames at an arbitrary point in a given frame, the digital watermark detector is often unable to extract the auxiliary data accurately without establishing temporal coordinates relative to the embedding coordinates. A similar synchronization problem can occur in the process of interpreting video transmitted in a network protocol over a network communication channel, or in the process of interpreting a compressed video compression format over a transmission channel or from storage.

To understand temporal synchronization, it is useful to consider an example application such as digital watermarking. Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. Temporal synchronization is relevant to digital watermarking applications for media signals with a temporal component such as video and audio. For the sake of illustration, we focus on video signals, but our techniques are applicable to other temporal signals, such as audio. Our examples can be extended to audio by considering temporal blocks of audio as frames.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal such that the watermark is imperceptible or nearly imperceptible to a human, yet automatically detectable with appropriate knowledge of the embedding function. The reading component analyzes a suspect signal to detect whether a watermark is present. In applications where the watermark encodes information, the reader extracts this information from the detected watermark. The embedding and reading functions typically employ parameters, typically referred to as a key or keys, that identify the attributes of the host signal that are changed to embed a watermark signal and that define how those attributes are to be interpreted to carry hidden message symbols. Several particular digital watermarking techniques have been developed for signals with a temporal component. The reader is presumed to be familiar with the literature in this field. Particular techniques for embedding and detecting imperceptible watermarks in media signals are detailed in the assignee's U.S. Pat. No. 6,122,403, which is herein incorporated by reference.

The challenge of temporal synchronization in video can be viewed as an analysis of a suspect video stream to determine its temporal coordinate system. For many applications, it is sufficient that the coordinate system is defined relative to neighboring sets of frames as opposed to some absolute reference point. One way to address the challenge is to search for the coordinate system, or some attribute of the hidden auxiliary data that indicates the coordinate system. In video watermarking, the watermark signal may be frame independent. For example, the key or embedding function may change with each frame. While this makes the watermark difficult to detect by unauthorized processes or attackers, it tends to complicate the synchronization process.

Alternatively, the watermark may be time invariant. For example, the watermark may be the same in every frame. While this extent of redundancy reduces the search space for the watermark to a great extent, it also simplifies unauthorized detection. Defined generally, temporal redundancy in watermarking refers to the degree to which the watermark signal can be deduced given the host signal's history. As temporal redundancy increases over time, the watermark is easier to deduce by a detector and attacker alike. Preferably, there should be an appropriate balance between ease of synchronization and security in watermarking.

This disclosure provides a protocol for temporal synchronization of media signals with temporal components. While the disclosure focuses on temporal synchronization of video in a watermark application, the protocol is applicable to other applications and media types.

The synchronization protocol achieves initial synchronization by finding an initial synchronization key through analysis of a temporal media signal stream. It then uses features of the stream and a queue of one or more keys from previous frames to derive subsequent keys to maintain synchronization. If synchronization is lost due to channel errors or attacks, for example, the protocol uses the initial synchronization key to re-establish synchronization. In digital watermarking applications, the synchronization protocol is agnostic to the digital watermark embedding and reading functions.

Further features of the synchronization protocol will become apparent with reference to the following detailed description and accompanying drawings.

DETAILED DESCRIPTION

We provide an example of our temporal synchronization protocol for video watermarking. Temporal de-synchronization can occur due to channel distortion and malicious attack. Channel distortion refers to typical processing that occurs in a given application that has an adverse impact on temporal synchronization. For example, in low bandwidth network connections among computers, the communication channel may give priority to certain data that shares the channel with the video. This may lead to loss of video frames (e.g., dropped packets) or changes in time scale. In addition, the transmitter or receiver of the video may lack processing power to transmit, receive or decode all of the data in time to deliver the video at a desired quality or frame rate, and thus, drop data and/or change the frame rate. Typical forms of signal transformations include lossy compression, digital to analog conversion, analog to digital conversion, re-sampling, time scaling, etc.

Malicious attack refers to processing intended to undermine the operation of the video watermark. Some examples for video watermarking include frame deletion, insertion, transposition, lossy compression, averaging, etc.

Our protocol introduces some temporal redundancy to assist in temporal synchronization, yet uses temporal variation to improve security. The protocol is sufficiently general to enable the implementer to select the desired balance between security and computational complexity of the synchronizer. The protocol can vary the watermark over time by changing the watermark key, the embedding function or both. In the example below, the protocol varies the watermark key.

Figure 1:
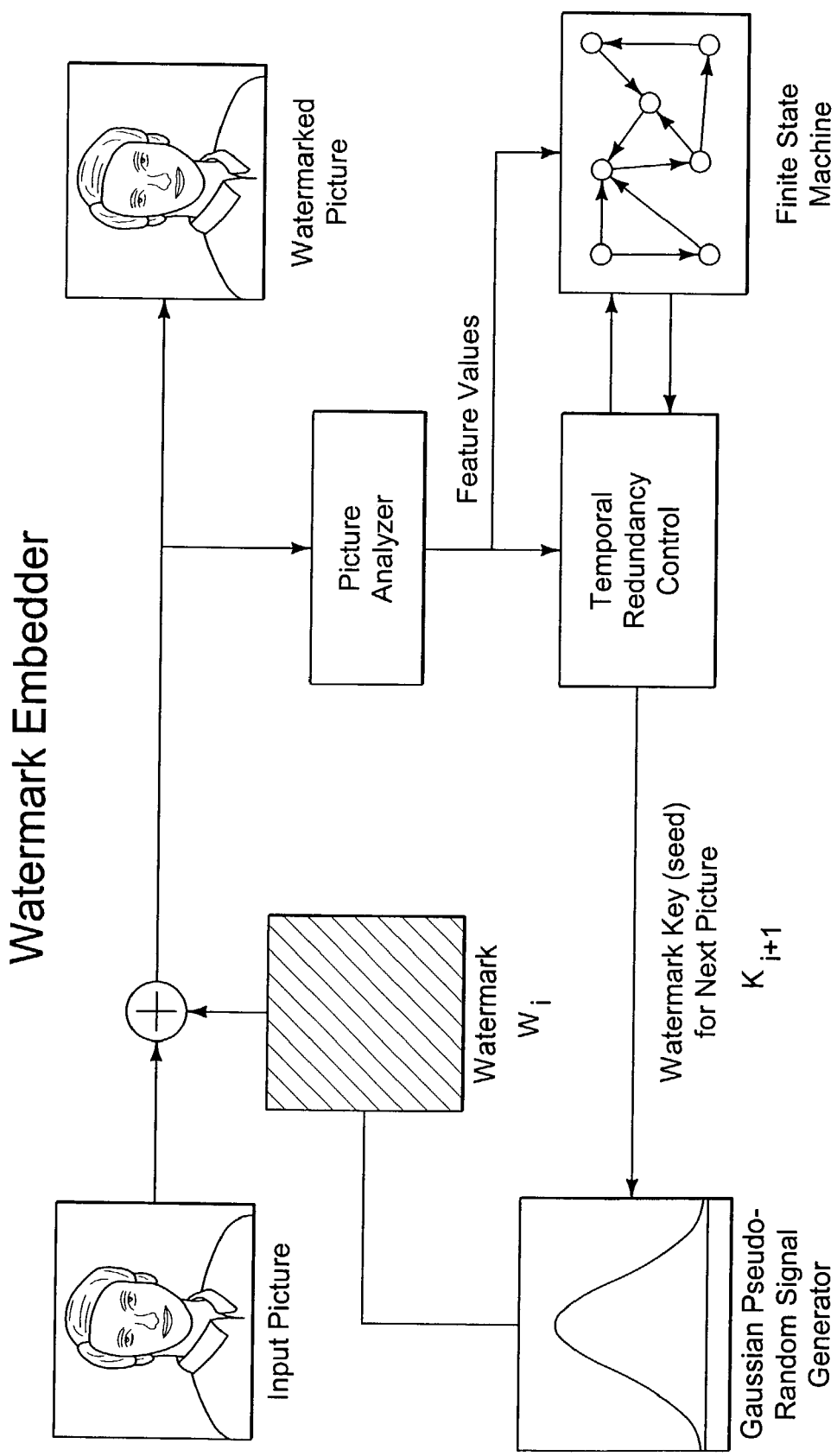
FIG. 1 illustrates an example of a synchronization protocol in a video watermark encoder.

To illustrate the protocol, FIG. 1 illustrates an example of the use of the protocol in the context of a video watermarking embedder. The synchronization protocol uses two primary parameters to control a sequence of watermark keys/embedding functions over time. The first parameter is the Period, which establishes the global redundancy of the protocol. In particular, it indicates the number of frames that are watermarked before resetting the protocol state. Our example implementation controls the state via a state machine and uses the state to vary the watermark key. It can also be used to vary the embedding function. For simplicity, we describe that the state machine output is used to index a watermark key in the remainder of the discussion. It may also be used to look up a corresponding embedding function.

The second parameter is called Repeat, which establishes the local redundancy within a Period. In particular, it defines the number of contiguous frames within the period that are embedded with the same watermark key and embedding function before changing the key.

The local redundancy allows the protocol to resist malicious attackers, and the global redundancy counteracts channel distortions. The global redundancy is also used where attacks exceed the capacity of the local redundancy to maintain synchronization.

In the protocol, an initial key is set either by the user, as a function of the host video signal, or a combination of both. One example is a pseudo-random (PN) sequence mapped to pixel or block locations within a frame. An example of a corresponding embedding function is one that computes a perceptual mask and adds scaled, antipodal elements of the sequence to selected elements in the spatial or frequency domain. The PN sequence may be generated by a seed derived from video features extracted from the frame. This is one example of a content dependent watermark key.

The encoder uses the initial key and associated embedding function to embed an initial watermark signal in an initial set of frames defined by the parameter, Repeat. While the particular example shown in FIG. 1 uses a spread spectrum spatial domain method for embedding the watermark, the synchronization protocol is agnostic to the specific type of embedding (and compatible) reading function used to hide the digital watermark in the video frames. In this example, the embedding function preferably employs a perceptual mask to scale the pseudo-random elements of the watermark signal before adding them to the host video frame. Other embedding functions may be used as well such as quantization techniques that quantize pixels, frequency coefficients or other signal features to levels or bins associated with a symbol element being encoded. For example, the key may be used to generate a PN sequence, whose elements are then mapped to features in the video frame. These features are then quantized to a level corresponding to the value of the element in the key.

The picture analyzer extracts features from each frame and inputs them to a finite state machine to get an index for the next watermark key. In our example implementation, the output of the analyzer is a set of feature vectors. In particular, the analyzer partitions blocks of pixels into groups based on an independent key. Alternatively, the analyzer can partition a frame based on segmentation of image objects as contemplated in MPEG-4 video.

For each partition, the analyzer computes a vector of feature values corresponding to the blocks in that partition. One example is:

Feature X=Quantizer[mean(pixels in X)]

In this example, the feature vector for partition X comprises the average of the luminance of the blocks, quantized appropriately to not be particularly sensitive to noise. Other examples include the average amount of motion between the frame and previous frame, and the variance of the Discrete Fourier Transform magnitudes of the frame. Preferably, the features are relatively simple to compute, and are sufficiently robust such that an attacker can only change the value of a feature by substantially degrading video quality. Other statistical features may be used as well.

Figure 3:
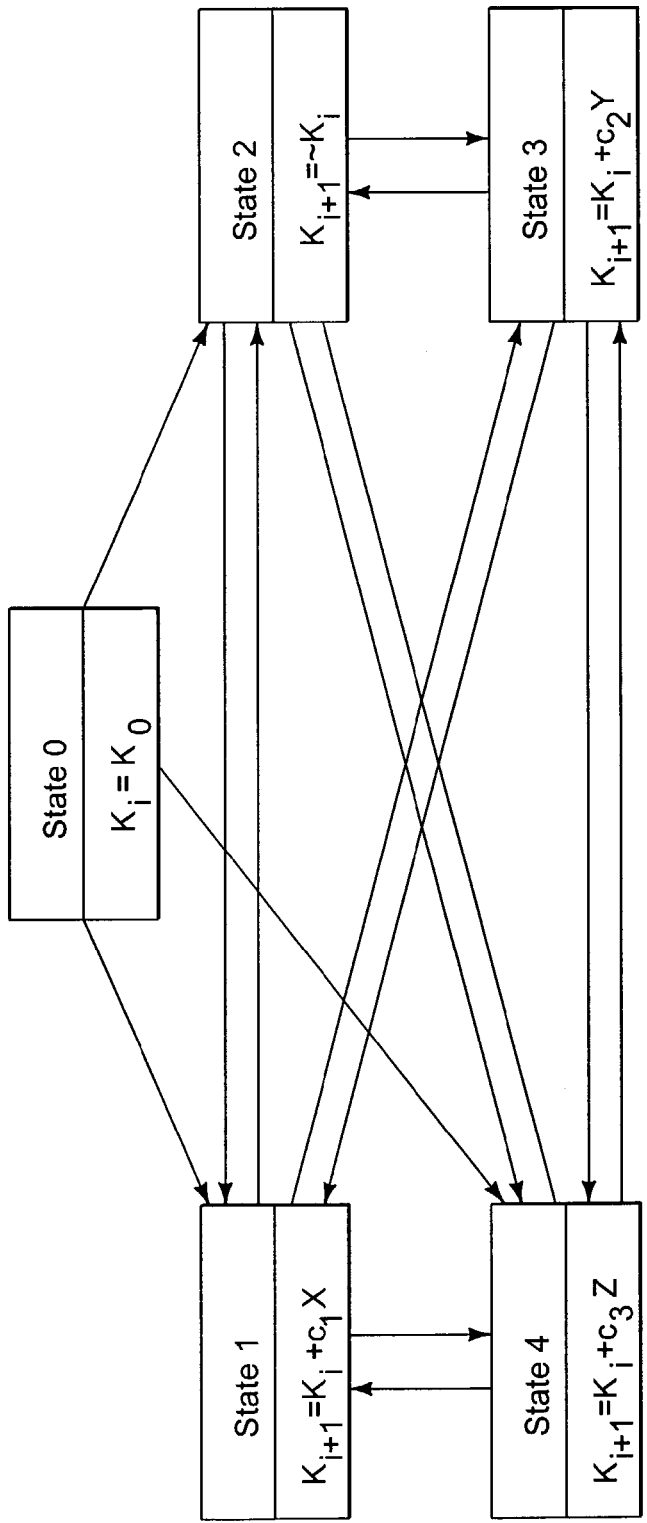
FIG. 3 illustrates an example of a state machine used to permute a key in the temporal synchronization protocol of FIGS. 1 and 2.

The feature values are inputs to a state machine. Each state indicates how to permute the key from one state to the next. FIG. 3 illustrates an example of a state machine. X, Y, and Z are feature vectors and $c_i$ scales the feature vectors. In one implementation, an independent key is provided to further obscure or permute a next watermark in, e.g., State 1, 3 and/or 4. Such an independent key provides additional security for our inventive system. In another implementation, $c_i$ comprises a uniform random number between 0 and 1. In still another implementation, $c_i$ comprises a predetermined or random scalar. For each group of frames in the Period, the watermark encoder uses the initial key to embed an initial watermark and computes the features to derive the key to embed subsequent frames.

There are a number of possible variations to the scheme described above. The state machine key generator may be designed to generate a key:

1. Based on features of the host signal;
2. Based on randomization, such as random data input, function (e.g., cryptographic function in the state machine), or random function;
3. Based on features and randomization; or
4. Without features or randomization;

State transitions may be made adaptively to the characteristics of the host signal as opposed to limiting to every Repeat frames.

In the case where feature values are used, feature values can be selected using perceptually weighted functions or measures. One example is a visual hash. See, for example, J. Fridrich, "Visual hash for oblivious watermarking," Proceedings of the SPIE Security and Watermarking of Multimedia Contents II, vol. 3971, San Jose, Calif., Jan. 24-26, 2000, pp. 286-294.

Figure 2:
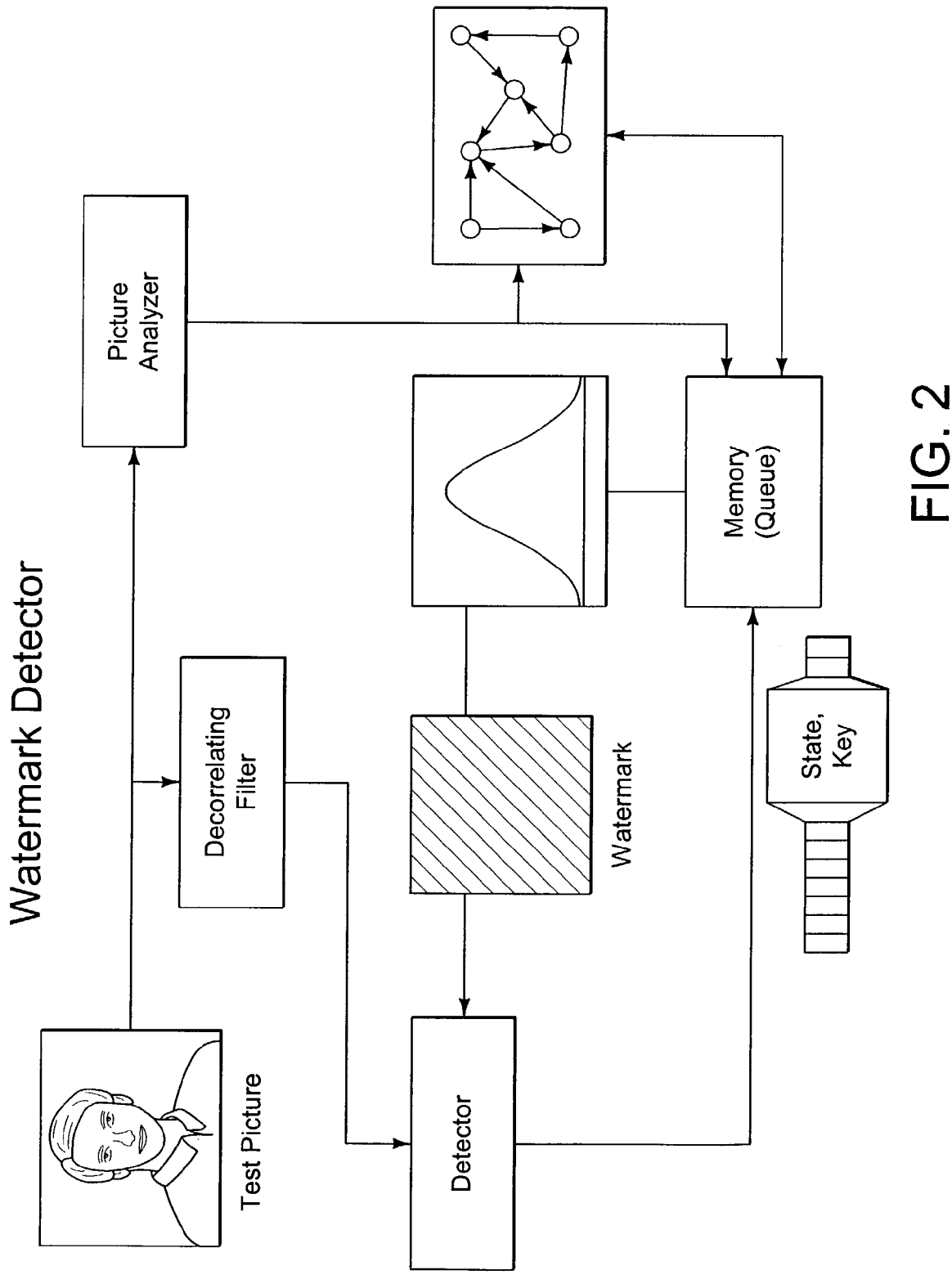
FIG. 2 illustrates an example of the synchronization protocol used in a watermark decoder compatible with the encoder of FIG. 1.

FIG. 2 illustrates a synchronizer for a watermark reader compatible with the encoder in FIG. 1. The synchronizer includes an analyzer and state machine compatible with their counterparts in the encoder. Optionally for some types of watermark reading functions, the suspect video signal may be pre-filtered using a de-correlating filter to de-correlate the watermark signal from the suspect signal.

To achieve initial synchronization, the synchronizer searches for an initial watermark using a known initial key and associated reading function. While many reading functions are applicable, one compatible reading function for our example comprises a linear correlator, which correlates the watermark signal based on the known key with the suspect video frames. This reading function is only one example, and any number of linear or non-linear reading functions compatible to the selected embedding function may be employed, including quantization based reading functions, statistical feature modulation functions, etc.

The synchronizer continues scanning frames until it detects the watermark embedded with the initial key and corresponding embedding function. After the synchronizer detects the watermark embedded with the initial key, the analyzer computes the feature values as in the encoder. The state machine stores the initial key and most recently detected watermark keys and corresponding synchronization states. The output of the state machine indexes the synchronizer to the key.

Using the indexed keys, the synchronizer checks every possible watermark indexed by the keys to find the one that produces the highest detection value (e.g., the highest correlation, the greatest number of correctly extracted known symbols or other detection metric). As described above, the state may be used to index both the key and reading function.

If the synchronizer finds a watermark, it moves the corresponding key and state to the top of its queue. It then inputs the features for the current frame into the state machine to find the next state and corresponding key (and reading function, if applicable).

A number of variations to the above system are possible. For example, the protocol may use multiple state machines, each with its own initial key, embedding/reading functions, feature dependencies and state. Preferably, the changes of the key from one frame to the next should be sensitive to the extent of the changes from one frame to the next. If the changes from one frame to the next are great, the amount of change to the key should take this into account to avoid wasted cycles trying to achieve synchronization.

The watermark embedding and reading methods may be designed to operate on compressed bit streams or uncompressed bit streams. Further, they can be designed to survive compression, and employ robust features that survive compression.

The synchronization protocol is applicable to other watermarking applications, other media types like audio, and non-watermark applications, like decoding of compressed bit streams. The synchronization protocol can use content features as the initial key, such as scene changes, scene cuts, wipes, fades, etc. The protocol achieves relative temporal synchronization at an arbitrary time point within a sequence of frames.

The pattern of key changes may be designed to convey payload information to the decoder. For example, different symbols may correspond to different patterns. By altering the video to adhere to these patterns in the encoder, the method can encode auxiliary data in the pattern of key changes.

Improving Security: Variations in the State Machine for the Key Generator

To improve the security of the temporal synchronization method, the key schedule should preferably be difficult to deduce without knowledge of the watermark embedding key, even if portions of the sequence is observed by an attacker. Equivalently, the implementation should minimize the amount of information given to an attacker about future states if he observes present and past states. A number of enhancements to the state machine key generator can be made to improve security.

We will now describe a state machine that uses randomization to improve security. In general, randomization may be incorporated into the state machine by using randomized state machines or a state machine with random components. For the sake of illustrating a state machine with randomization, we use a state machine with a cryptographic hash function and random input for its state transition function. A hash function H takes arbitrarily sized (# of bits) input M and produces a message digest $MD=H(M)$ of exactly size L bits. An example hash function is SHA-1, which produces a message digest of $L=160$ bits.

This state machine is described by the set of states, the state transition function, and the initial state. We establish the set of states S to be the set of message digests, with each state corresponding to a unique digest. The cardinality of the state set is thus $|S|=2^L$, since there are $2^L$ possible bit combinations of a sequence of exactly L bits. We identify the initial state $S_0$ as the state with the same digest as the embedding key $S_0=K_E$. This implies that the embedding key space also has cardinality $2^L$. The state transition function is defined as:

$$\{NextStates\}=hash(K_E, State, Features, Random) \quad (1)$$

where {NextStates} is the set of possible next states, $K_E$ is the embedding key, State is the current state, Features is the feature vector from the feature extractor, and Random is bits whose values are randomly determined during watermark embedding. The values of the random bits are not provided to the watermark detector, but because the watermark detector has a queue and is capable of performing a limited search, it will be possible for the detector to search the set of all possible next states if the number of random bits is small. If no random bits are used, then there will be exactly one possible next state for each given current state. If there are R random bits used, then there are $2^R$ combinations of those bits, and thus, there will be $2^R$ possible next states for each state. At the detector side, the detector adds all of the {NextStates} and their corresponding keys into the queue, since the detector is not sure which state the encoder might choose.

The key used for watermark embedding corresponding to each state is a subset of bits from the digest of the current state. It is possible that this subset of bits be key-dependent or state-dependent, or both. Let the function KT(MD) be the key transition function that takes a L-bit message digest and computes a N-bit key used for watermarking. The message digest may be used directly as a seed to a random number generator to compute the key. In this case, the function, KT, extracts a subset of N=32 bits from those L=160 bits for use as input to a random number generator that generates the watermark signal.

Another mode of operation to consider is to use all random bits and no feature vector bits. This mode of operation loses its advantage of being host signal-dependent, but has a couple of advantages of its own. Feature values are not used (or calculated), which saves computation time. This mode also allows the detector to be completely immune to any spatial attacks on watermarked video because there is no dependence on feature values.

In another enhancement, we can choose a randomly-determined initial state from a set of initial states, instead of beginning the state machine at $S_0$ every time.

This state machine has a number of potential advantages:

This state machine generates more states, which may make deducing the structure of the machine much more difficult.

This state machine has a key-dependent structure (because the state transitions depend on $K_E$ as well as the current state.) This means that the sequence of states that are used to create the watermarks for two different users (with different $K_E$'S) will not be identical, even if feature values are identical.

Even assuming that feature values are invariant (or are not used), adding randomness (in the form of the random bits) increases the uncertainty in the system. While this implies that the detector may need to have a larger queue to search all the possible next states, a degree of uncertainty helps increase the security of the system because it makes it more difficult for an attacker to predict the state and key sequences.

The use of the random function allows the state machine to treat all of the feature values "fairly", without (implicitly or explicitly) giving an importance to a particular feature value. Different elements of the feature vector can have different dynamic ranges without causing any need for scaling or normalization, since feature values in this scheme are not compared against each other. This also allows feature vectors of any length without having any special implementation issues, since the hash function works on an input of any number of bits. Feature vectors can even be different lengths for each frame.

Improving Robustness against Temporal Attacks

To improve the robustness against temporal attacks, the implementer may use an adaptive algorithm to determine the state transitions based on the feature extractor, as opposed to a fixed repeat parameter for temporal redundancy control. Specifically, instead of changing the watermark at a fixed rate of every α (Repeat) frames, the system changes the watermark only after feature values remain constant for γ frames. This implies that there is now a connection between the feature extractor and the temporal redundancy control. This change does not require any modification to the watermark detector.

Another option is to perform feature analysis on every frame prior to watermark insertion, and change the watermark only when feature values change, and then, only after γ frames have been observed where the feature values do not change.

Improving Robustness against Spatial Attacks:

A potential vulnerability of the temporal synchronization method is that spatial attacks can potentially affect feature values. Once the feature values change, then the detector will no longer be able to produce the key schedule as the encoder and must wait until a resynchronization frame is encountered.

One method to increase the robustness against spatial attacks is to use features that provide a balance between robustness and variability over time. The features need to be robust such that they remain invariant relative to their original values after embedding of the watermark and after benign, content preserving manipulation of the content. Such types of benign manipulation that the features must survive are application dependent, and can include such processing as mild lossy compression, format conversion, etc. The features should remain invariant as long as the quality of the content is maintained above some desired quality level, such as a quality level measured by a human perceptual model (e.g., Just Noticeable Differences models, Watson visual quality metrics, quality models used in MPEG and/or JPEG coding of content, etc.). One potentially advantageous category of features is a set of features that is based on perceptually relevant features. Perceptually relevant features are features that are derived, at least in part, based on features that relevant to the semantic meaning of the image or audio content to the viewer or listener. Such perceptual based features are invariant to changes in the content that are content preserving with respect to a perceptually quality metric. These features are computed using a perceptual function, including but limited to a visual hash, human perceptual model, etc.

In video, for example, we select features that are not too sensitive to the spatial domain pixel values because overly sensitive feature values may change in value over every frame and not yield any temporal redundancy. On the other hand, we want to select features that do change in time; otherwise, there would not be any point to using the features extraction. In other words, we select a function whose values, for a typical video sequence, are sensitive enough to change over the sequence but are not so sensitive that their values change with a slightest perturbation of the pixel values in the spatial domain.

Another method to increase robustness against spatial attacks is to not use features at all and use a state machine that only and possibly random bits.

Example Implementation:

In the follow sections, we describe an example implementation.

1. Preliminaries and Definition of Symbols

| | |
|---|---|
| hash(...) | A cryptographically secure hash function that takes an arbitrarily sized input and produces a message digest of exactly L bits. |
| KE | Master Embedding Key |
| K | Embedding key for watermarking an individual frame. This key is of size N bits, which may be different than the size of $K_E$. |
| KT | Key Transition function. In general, KT can depend on the current state, past state(s), and past key(s). This function takes its inputs and produces a N-bit watermark key. |
| KD | Master Detection Key (which equals $K_E$) |

In this example, we use SHA-1 as the cryptographic hash function, which produces a message digest of L=160 bits in length. This is, of course, an implementation parameter.

$K_E$ will be a 32-bit quantity. The size of $K_E$ is an implementation parameter.

K will be a 32-bit quantity (so N=32). The size of K is an implementation parameter that depends on the specific technique used to generate watermark signals for each frame. This length is chosen to be compatible with a Gaussian random number generator with a 32-bit internal state. If the watermark embedder uses more than 32 bits of state information, we can choose a larger value for the key length.

In our implementation, KT is a function that depends only on the current state and not directly on any past states or keys. (However, because past states, feature values, and random bits are used to determine the current state, KT does indirectly depend on those factors.) Because our KT is dependent only on the current state, and each state corresponds to a unique message digest produced by SHA-1, our KT will take as input a 160-bit value and output a subset of 32 bits.

There are many other possible choices for KT, such as using another hash function that produces a message digest of desired size.

2. Watermark Embedding Procedure (WEP)

The watermark embedding procedure uses a state machine that is defined using cryptographic hash functions, random starting states, and random bits in the state transitions. It is also possible to adapt the state transitions to the video characteristics, which increases robustness against temporal attacks.

Initialization

The initialization step is performed only once, after the embedding key $K_E$ is known. The goal of this step is to produce the set of {InitialStates} that will be used for starting the embedding process as well as for resynchronization frames.

There are two design parameters in this section: How many initial states to use, and how to generate the set of initial states.

How many states to use? The greater the number of initial states, the more difficult it may be for an attacker to try to deduce the state or key transitions by techniques such as analysis by Markov models. However, the larger the set of initial states, the more detections that the detector will have to perform because the detector must search the entire set of initial states for every frame.

Let NIS=Number of Initial States. This parameter may vary, but we choose a fixed, small constant (NIS=2).

How to generate the set of initial states?

There are many ways which one can generate the set of initial states from $K_E$. In this example, we will generate the set of initial states by using the function:

$$\{InitialStates\} = hash(K_E, X) \quad (1)$$

where X is an integer that is varied from 1 ... NIS. Each value of X generates a unique state in the set of {InitialStates}.

Watermark Embedding: Main Loop

1. Set S, the current state of the state machine, to a random member of {InitialStates}.
2. Compute K=KT(S), which is the corresponding key to state S.
3. Set a=0, b=0.
4. Read a frame of the input video.
5. Send the current key K to the watermark embedder to watermark the current frame.
6. Increment a by 1. If a<α (Period), continue to the next step. Otherwise, go to step 1.
7. This step depends on whether adaptive state transitions are used or not:

If adaptive state transitions are not used:
    a. Increment b by 1.
    b. If b<β (Repeat), go to step 4. Otherwise, set b=0 and continue to step c.
    c. Run the feature analyzer on the current, watermarked frame to obtain the feature values. Let F be the feature vector output from the feature analyzer. Continue to step 8.

If adaptive state transitions are used:
    a. Run the feature analyzer on the current, watermarked frame to obtain the feature values for the current frame. Let F be the feature vector output from the feature analyzer.
    b. Compare F, the current feature values, with LF, the feature values obtained from the previous frame. If F≠LF, then set LF=F and b=1. Otherwise, increment b by 1.
    c. If b<γ, go to step 4. Otherwise, set b=0 and continue to step 8.
8. Generate RN, an R-bit random number.
9. Obtain the next state by computing NextState=hash($K_E$, S, F, RN).
10. Obtain the next key by computing NextKey=KT(NextState).
11. Set S=NextState, K=NextKey, and continue to step 1.

Parameters For the Main Loop Include:

The cryptographic hash function used for the state transitions.

The key transition function KT, used to obtain the next key.

Whether adaptive state transitions is used.

The period parameter α

The repeat parameter β if adaptive transitions are not used, or

The number of frames that must have the same feature value prior to a state transition γ, if adaptive state transitions are used.

The feature analysis.

R, the number of random bits used for determining the next state. Because the necessary number of elements in the queue of the detector grows exponentially as R increases, R is typically a small value (such as 0,1,2, or 3.) If R is zero (no random bits used), there will always be a unique next state for a given current state and feature values.

3. Watermark Detection Protocol (WDP)

Initialization

The watermark detector needs to know the set of {InitialStates}, so the initialization for the detector is identical to the initialization for the embedder (see Section on Initialization in sub-section 2). In addition, the detector also obtains the set of {InitialKeys} which correspond to computing KT(S) for each state S in the set {InitialStates}.

The Detection Queue Starts Out Empty.

Watermark Detection: Main Loop

1. Read a frame of the video.
2. Attempt to detect the watermark by using:
    a. Every key stored in the queue.
    b. Every key in the set {InitialKeys}.
3. If no watermark was found during step 1, go back to step 1 to try and detect a watermark in the next frame.

4. If the watermark found during step 1 does not correspond to one of the keys in the set of {InitialKeys}, that key must be present in the queue. Move that (State,Key) pair to the head of the queue.

Otherwise, the detected watermark must be a member of the set of {InitialKeys}. Set the current state to the member of {InitialStates} that corresponds to the member of {InitialKeys} that was detected.

5. Perform feature extraction on the watermarked image, to obtain F, the feature values.

6. Compute the set of {NextStates}=hash($K_D$, State, F, RN) for every possible combination of random bits RN. If random bits are not used by the embedder, then there will only be one state in the set of {NextStates}.

7. For each state in {NextStates}, find its corresponding key using K=KT(NextState) and add that (State,Key) pair into the queue. Because the queue is of finite size, this operation can cause one or more entries at the tail of the queue to be lost.

8. Continue in step 1.

Implementation Parameters:

The queue size (number of entries in the queue).

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patent referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of temporal synchronization of a media signal with a temporal component, the method comprising:
    using a programmed computer to perform the acts of:
    establishing keys relative to temporal locations in the media signal to provide temporal synchronization;
    deriving perceptual features from perceptual image or audio data in temporal locations of the media signal relative to the locations of the keys;
    based on the perceptual features, deriving changes to the keys to compute derived keys for other temporal locations in the media signal than the locations corresponding to the keys, wherein the keys and the derived keys represent a synchronization protocol for the media signal, and the derived keys include at least a first derived key that is a function of another key for a different temporal location of the temporal locations and a first perceptual feature of the perceptual features.

2. The method of claim 1 wherein the synchronization protocol is used to control digital watermark embedding of an auxiliary hidden signal in the media signal as a function of the keys and the derived keys.

3. The method of claim 1 wherein a state machine takes the first perceptual feature and one or more previous keys as input, and generates output for establishing a subsequent key.

4. The method of claim 3 wherein a synchronization state in the state machine is periodic over time in the media signal.

5. The method of claim 1 wherein the synchronization protocol is used to control digital watermark reading of an auxiliary hidden signal in the media signal as a function of the keys and the derived keys.

6. A non-transitory computer readable medium on which is stored instructions, which when executed by a computer, perform a method of temporal synchronization of a media signal with a temporal component, the method comprising:
    establishing keys relative to temporal locations in the media signal to provide temporal synchronization;
    deriving perceptual features from perceptual image or audio data in temporal locations of the media signal relative to the locations of the keys;
    based on the perceptual features, deriving changes to the keys to compute derived keys for other temporal locations in the media signal than the locations corresponding to the keys, wherein the keys and the derived keys represent a synchronization protocol for the media signal, and the derived keys include a first derived key that is a function of another key for a different temporal location of the temporal locations and a first perceptual feature of the perceptual features.

7. A temporal synchronization method for digital watermarking comprising:
    using a programmed computer to perform the acts of:
    computing at least one perceptual feature from an image or audio signal representing perceptual content in the time varying portions of a host signal;
    using a state machine to vary a watermarking key over time as a function of the at least one perceptual feature and a key for a different temporal location; and
    using the watermarking key to generate a digital watermark signal for use in embedding a digital watermark into a host signal or detecting a digital watermark from a host signal; wherein the state machine varies the watermarking key dependent on the at least one perceptual feature of the host signal.

8. The method of claim 7 wherein the state machine includes randomization.

9. The method of claim 8 wherein the randomization is derived from a random function.

10. The method of claim 8 wherein the state machine includes a cryptographic hash function.

11. The method of claim 7 including:
    deriving feature values from a host signal; and
    using the features values as input to the state machine to generate the watermark key.

12. The method of claim 11 wherein the features are derived from a perceptual function.

13. The method of claim 12 wherein the perceptual function comprises a perceptual hash of the host signal.

14. A temporal synchronization method for digital watermarking comprising:

using a programmed computer to perform the acts of:
computing at least one perceptual feature from an image or audio signal representing perceptual content in the time varying portions of a host signal;
using a state machine to vary a watermarking key over time as a function of the at least one perceptual feature; and
using the watermarking key to generate a digital watermark signal for use in embedding a digital watermark into a host signal or detecting a digital watermark from a host signal; wherein the state machine varies the watermarking key dependent on the at least one perceptual feature of the host signal; wherein the state machine changes the watermarking key over time by making state transitions over time, and wherein the state transitions are dependent on variations in features of the host signal.

15. The method of claim 1 wherein the first perceptual feature is a perceptual hash of an image or audio signal in the media signal.

16. A non-transitory computer readable medium on which is stored instructions, which when executed by a computer, perform a temporal synchronization method for digital watermarking comprising:

computing at least one perceptual feature from an image or audio signal representing perceptual content in the time varying portions of a host signal;

using a state machine to vary a watermarking key over time as a function of the at least one perceptual feature and a key for a different temporal location; and using the watermarking key to generate a digital watermark signal for use in embedding a digital watermark into a host signal or detecting a digital watermark from a host signal; wherein the state machine varies the watermarking key dependent on the at least one perceptual feature of the host signal.

\* \* \* \* \*